J. H. MEAD.
VALVE.
APPLICATION FILED MAR. 20, 1922.

1,434,447.

Patented Nov. 7, 1922.

Inventor
John Henry Mead

Patented Nov. 7, 1922.

1,434,447

UNITED STATES PATENT OFFICE.

JOHN HENRY MEAD, OF TORONTO, ONTARIO, CANADA.

VALVE.

Application filed March 20, 1922. Serial No. 545,195.

*To all whom it may concern:*

Be it known that I, JOHN HENRY MEAD, a subject of the King of Great Britain, and resident of the city of Toronto, county of York, Province of Ontario, in the Dominion of Canada, have invented certain new and useful Improvements in Valves, described in the following specification, and illustrated in the accompanying drawings, that form part of the same.

The principal objects of this invention are, to produce a valve particularly adapted for use in automobile tires which will effectively prevent the leakage of air therefrom and will not be liable to get out of order, and further to devise a structure which will allow of the interchange of other standard valves.

The principal feature of the invention consists in the novel construction and arrangement of a removable valve seat within the valve casing and of the valve supporting member, whereby a valve of large diameter is adapted to engage the seat and is capable of removal and whereby another standard form of valve seat and valve may be introduced in place thereof.

Figure 1:
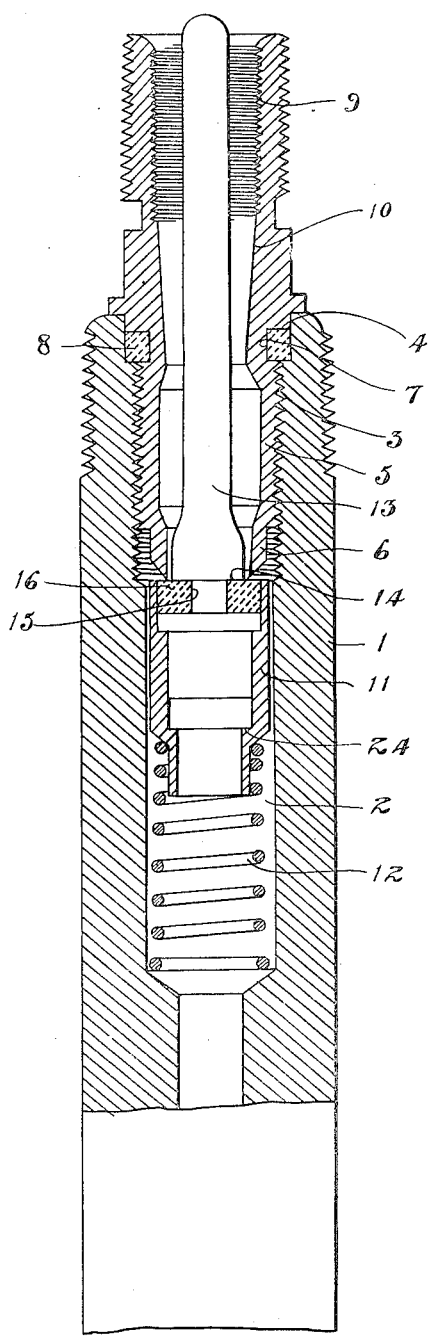

In the drawings, Figure 1 is an enlarged vertical sectional view of my improved valve structure.

Figure 2:
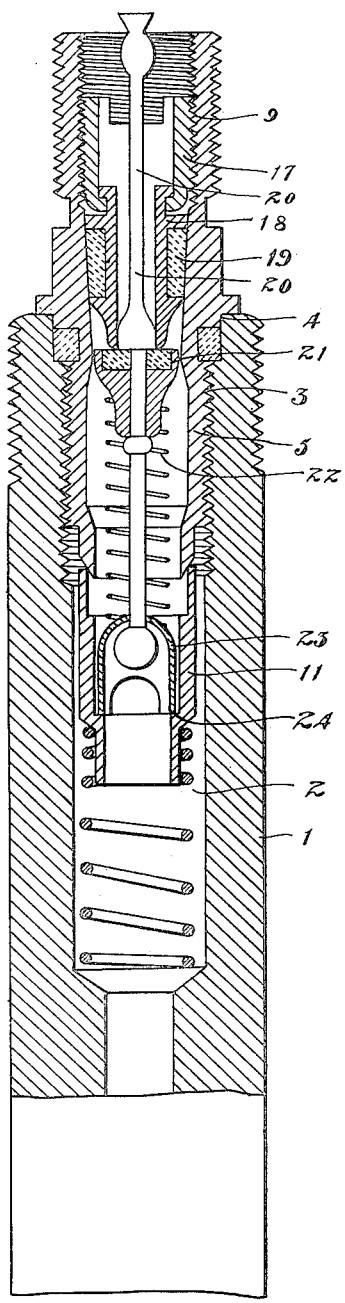

Figure 2 is an enlarged vertical sectional view showing my valve removed and a Schraeder valve seat and valve inserted.

The valve body 1 is formed with a counter-bore 2 the upper end of which is provided with an internal thread 3 and a further counter-bore 4 is formed at the top end.

A sleeve 5 is formed at its lower end and a tapered valve seat 6 above which said sleeve is externally threaded to fit the thread 3 and an annular recess 7 is fitted with a soft metal gasket 8 to fit into the top counter-bore.

The exterior of the upper end of the sleeve is threaded to receive a suitable valve cap and the interior wall at the upper end is provided with a thread 9 below which is arranged a tapering surface 10.

The interior diameter of the sleeve is preferably enlarged below the tapered portion 10 and again restricted at the lower end forming the valve seat.

Within the counter-bore 2 below the sleeve 5 is arranged a sleeve 11 which is loose within the counter-bore and supported by a spiral spring 12. The upper end of this sleeve is counter-bored to a diameter larger than the valve seat 6 and the valve stem 13 is provided with a shoulder 14 to enter the counter-bore and abut the shoulder thereof.

An annular channel 15 is formed in the valve stem to receive the valve 16 which is in the form of a rubber ring and is adapted to engage the valve seat.

The air from the inner end of the valve pressing against the enlarged bottom end of the valve stem exerts a very strong pressure, thus holding the valve 16 in air tight contact with the valve seat. The valve is free to resist from the seat upon the application of an overbalancing pressure from the outer end when the tire is being inflated.

A valve structure as described is extremely effective in use as the circumference of the valve seat is extraordinarily large and the valve being correspondingly of large dimensions contains a body of rubber to ensure a very secure seat.

In view of the existing peculiar conditions wherein the Schraeder valve is almost universally used it is practically impossible to arrange for the universal introduction of repair parts for a new type of valve and the present construction allows of the use of the Schraeder valve centre for repair work, if repair parts for my valve are not available.

The Schraeder valve centre as shown in Figure 2 of the drawings consists of a threaded sleeve 17 threaded into the upper end of the sleeve 5. Attached to this sleeve is the sealing sleeve 18 which is provided with a rubber gasket 19 to engage the tapering wall 10 of the sleeve 5.

The valve stem 20 carries the valve 21, spiral spring 22 and the pressed metal cup 23 which cup fits into the sleeve 11 and engages the shoulder 24 therein. The original valve stem is of course removed before the Schraeder valve centre is inserted. This is accomplished by unscrewing the sleeve 5 and after it is replaced the Schraeder centre is inserted.

It will be understood from this description that a valve constructed as described may always be repaired even though the person using the valve may not be able to obtain the proper repair valve as the universally used Schraeder valve may be substituted.

What I claim as my invention is:—

1. In an air valve, a body threaded internally, a sleeve threaded into said body having an annular valve seat at the inner end, a valve stem extending through said sleeve, an annular valve carried by said stem adapted to engage said valve seat from the inner side, a sleeve member loosely supported within the valve body below the valve seat adapted to support said valve, and a spiral spring supporting said loose sleeve.

2. In an air valve, a body threaded internally, a sleeve threaded into said body having an annular valve seat at the inner end, a valve adapted to engage said valve seat, a spring supported sleeve loosely mounted within the valve body and supporting said valve, and means adapted to co-operate with said loose sleeve and with the fixed sleeve to seal the air passage therethrough separately from the valve seat at the inner end.

3. In an air valve, a body threaded internally, a sleeve threaded into said body having an annular valve seat at the inner end, said sleeve having an internally threaded upper end and a converging wall below the thread, a valve centre comprising a valve seat and valve adapted to be secured in the threaded upper end of said sleeve and to engage the tapered wall in an air tight joint, a valve adapted to co-operate with the valve seat at the inner end of the fixed sleeve, and means for supporting said valve adapted upon the removal of the latter valve to support the valve of the inserted valve unit.

JOHN HENRY MEAD.